United States Patent
Lee

(10) Patent No.: US 9,809,156 B2
(45) Date of Patent: Nov. 7, 2017

(54) VEHICLE SAFETY INDICATING APPARATUS WHICH AUTOMATICALLY TURNS ON THE CORRECT TURN SIGNAL

(71) Applicant: Hao-Chieh Lee, Taoyuan (TW)

(72) Inventor: Hao-Chieh Lee, Taoyuan (TW)

( * ) Notice: Subject to any disclaimer, the term of this patent is extended or adjusted under 35 U.S.C. 154(b) by 145 days.

(21) Appl. No.: 14/965,161

(22) Filed: Dec. 10, 2015

(65) Prior Publication Data

US 2017/0166112 A1 Jun. 15, 2017

(51) Int. Cl.
*G08B 21/00* (2006.01)
*B60Q 1/34* (2006.01)
*B60Q 1/00* (2006.01)
*B60Q 1/40* (2006.01)
*B60Q 1/26* (2006.01)

(52) U.S. Cl.
CPC ............ *B60Q 1/346* (2013.01); *B60Q 1/0082* (2013.01); *B60Q 1/343* (2013.01); *B60Q 1/40* (2013.01); *B60Q 1/2607* (2013.01)

(58) Field of Classification Search
CPC ...................................................... B60Q 1/346
USPC ................................ 340/465, 468, 475, 476
See application file for complete search history.

(56) References Cited

U.S. PATENT DOCUMENTS 3,784,974 A * 1/1974 Hamashige .......... B60Q 1/2657
340/464

FOREIGN PATENT DOCUMENTS

| CN | 202320178 U | 7/2012 |
|----|-------------|--------|
| TW | M398494 U | 2/2011 |
| TW | M403461 U1 | 5/2011 |
| TW | M404803 U | 6/2011 |
| TW | M444308 U | 1/2013 |
| TW | M461564 U | 9/2013 |

\* cited by examiner

*Primary Examiner* — Jeffery Hofsass
(74) *Attorney, Agent, or Firm* — Li & Cai Intellectual Property (USA) Office

(57) ABSTRACT

A safety indicating apparatus is provided for a vehicle that includes a turn direction manual switch, a turn direction detector, two turn signal indicator lamps, and a turn signal control module. The turn signal control module is configured for operatively determining whether the desired turn direction indicated by the desired turn signal is corresponding to the actual turn direction indicated by the actual turn signal while the operator turns the vehicle. Accordingly, the turn signal control module can automatically turn on/off the turn signal indicator lamps in response to the actual turn direction of the vehicle to avoid a near miss or a traffic accident.

9 Claims, 4 Drawing Sheets

VEHICLE SAFETY INDICATING APPARATUS WHICH AUTOMATICALLY TURNS ON THE CORRECT TURN SIGNAL

BACKGROUND

1. Technical Field

The present disclosure relates to an indicating apparatus, in particular, to a safety indicating apparatus for a vehicle.

2. Description of Related Art

As technology advances, mobile vehicles, such as cars, buses, motorcycles, or bicycles, can provide door to door transportation convenience and comfort. People can be quickly and comfortably transported to a specific destination. Hence mobile vehicles have gradually become the dominant means of transportation in modern life due to their convenience.

As will be appreciated by those familiar with the operation of conventional turn signal indicator lamps of mobile vehicles, turn signal indicator lamps generally are located on the right and left sides of the mobile vehicle near the front and rear. When a driver wishes to turn the mobile vehicle in the right or left direction, the driver can activate the right or left turn signal indicator lamps by pressing on a turn signal switch such that the turn signal indicator lamps on either the right or left side of the vehicle flash based upon the intended motion of the vehicle.

However, the driver may wish to make the mobile vehicle turn for example to the left (e.g., to change traffic lanes) by activating the left turn signal indicator lamp, but turns the mobile vehicle right, so that another driver in the right rear may be too close and coming too fast to safely stop or slow down enough to avoid a near miss or a traffic accident.

SUMMARY

Accordingly, exemplary embodiments of the present disclosure provide a safety indicating apparatus for a vehicle, which can effectively and instantly determine whether the right or left turn signal indicator lamps activated by an operator are corresponding to the actual turn direction of the vehicle through actively detecting the actual turn direction of the vehicle.

An exemplary embodiment of the present disclosure provides a safety indicating apparatus for a vehicle which includes a turn direction manual switch, a turn direction detector, two turn signal indicator lamps, and a turn signal control module. The turn direction manual switch is configured for providing a desired turn signal activated by an operator to indicate a desired turn direction of the vehicle. The turn direction detector is configured for providing an actual turn signal to indicate an actual turn direction of the vehicle. The two turn signal indicator lamps are operated for selectively turning on or turning off on the basis of the desired turn signal or the actual turn signal. The turn signal control module is electronically connected to the turn direction manual switch, the turn direction detector, and the turn signal indicator lamps. The turn signal control module is configured for operatively determining whether the desired turn direction indicated by the desired turn signal is corresponding to the actual turn direction indicated by the actual turn signal while the operator turns the vehicle. When the turn signal control module determines that the desired turn direction indicated by the desired turn signal is opposite to the actual turn direction indicated by the actual turn signal, the turn signal control module automatically turns off one of the turn signal indicator lamps activated by the desired turn signal and turns on another one of the turn signal indicator lamps in response to the actual turn direction indicated by the actual turn signal.

In one embodiment, the turn direction detector can be a compass or a gyro sensor, and can be disposed on a wheel of the vehicle.

In one embodiment, the turn direction detector can be disposed on a shaft transmission system of the vehicle, and can be a shaft transmission rotation sensor for detecting a rotational direction of a shaft of the shaft transmission system.

In one embodiment, the turn direction detector can be disposed on a steering handle system of the vehicle, and can be a steering handle rotation sensor for detecting a rotational direction of a steering handle of the steering handle system.

In one embodiment, the turn direction detector can be disposed on a body shell of the vehicle, and can be a tilt sensor for sensing a tilt angle of the body shell of the vehicle.

To sum up, the exemplary embodiments of the present disclosure provide a safety indicating apparatus for a vehicle which can, through disposing a turn direction detector on a vehicle (e.g., a car or a motorcycle), actively determine whether the desired turn direction indicated by the desired turn signal is corresponding to the actual turn direction indicated by the actual turn signal while the operator turns the vehicle thereby reducing the possibility of a traffic accident.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Exemplary Embodiment of a Safety Indicating Apparatus

Figure 1:
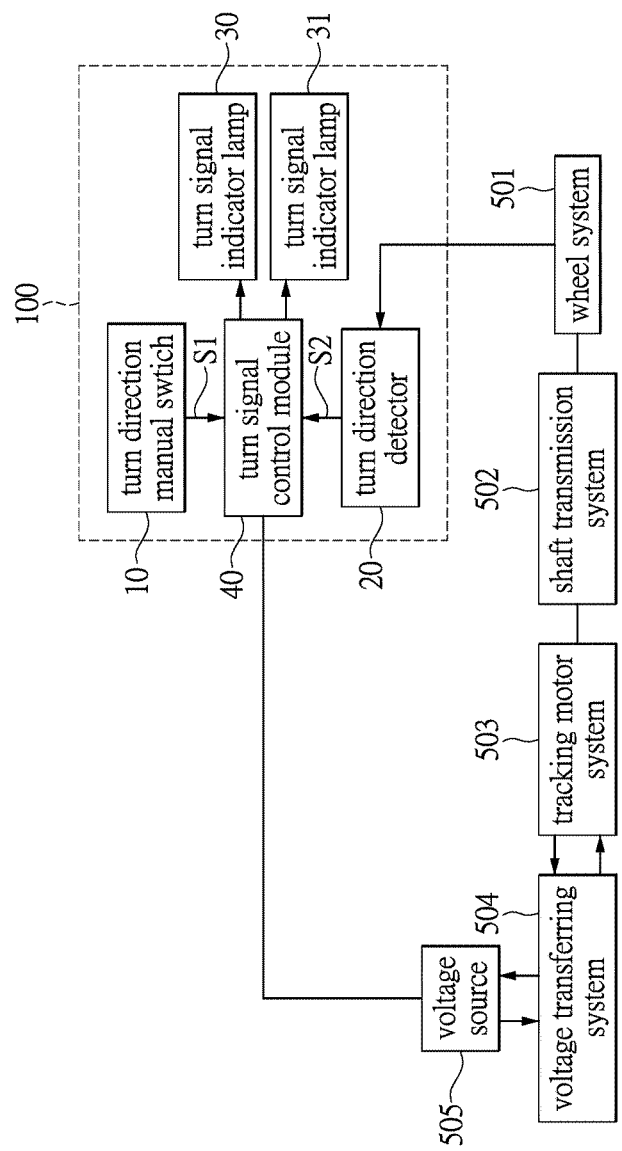
FIG. 1 is a functional block diagram of a safety indicating apparatus for a vehicle provided in accordance to a first exemplary embodiment of the present disclosure.

Please refer to FIG. 1, which shows a functional block diagram of a safety indicating apparatus provided in accordance to a first exemplary embodiment of the present disclosure. The safety indicating apparatus 100 can be used in a vehicle (e.g., a car, an electric motorcycle, and a bicycle), and can be integrated and disposed in the vehicle. The safety indicating apparatus 100 can be configured to detect whether the right or left turn signal activated by an operator (e.g., a car driver, an electric motorcycle rider, or a bicycle rider) is corresponding to the actual turn direction of the vehicle through actively detecting the actual turn direction of the vehicle.

In short, the safety indicating apparatus 100 may determine whether the operator is properly activating the turn signal indicator lamp through detecting whether the desired turn direction indicated by the desired turn signal is corresponding to the actual turn direction indicated by the actual turn signal while the operator turns the vehicle so as to achieve the driving safety of the vehicle.

Specifically, the safety indicating apparatus 100 used in the vehicle (e.g., the electric motorcycle) includes a turn direction manual switch 10, a turn direction detector 20, two turn signal indicator lamps 30, 31, and a turn signal control module 40. The turn direction manual switch 10, the turn direction detector 20, and the turn signal indicator lamps 30, 31 are electrically connected to the turn signal control module 40 respectively.

The turn direction manual switch 10 is configured for providing a desired turn signal S1 activated by the operator to indicate a desired turn direction of the vehicle.

In this embodiment, the turn direction manual switch 10 may be a push button type switch, a slide switch, an electrical switch, or a mechanical switch, and can be disposed on a steering handlebar at a position proximal to a hand grip of the vehicle. Accordingly, when the vehicle is travelling straight and it is desired to make a turn to the right or left, the turn direction manual switch 10 can be activated to generate the desired turn signal S1 such as the desired right or left turn signal to indicate the desired turn direction of the vehicle.

The turn direction detector 20 is configured for providing an actual turn signal S2 to indicate an actual turn direction of the vehicle.

In this embodiment, the turn direction detector 20 may be a compass or a gyro sensor, and can be disposed on a wheel system 501 of the vehicle. Accordingly, when the vehicle is travelling straight and then makes a turn to the right or left, the turn direction detector 20 can detect the turning of the wheel of the wheel system 501 and generate the actual turn signal S2 such as an actual right or left turn signal to indicate the actual turn direction of the vehicle.

The turn signal indicator lamps 30, 31 can be placed at the right side and the left side of the vehicle. The turn signal indicator lamp 30 can be a right turn signal indicator lamp, and another turn signal indicator lamp 31 can be a left turn signal indicator lamp. The turn signal indicator lamps 30, 31 are operated for selectively turning on/off on the basis of the desired turn signal S1 or the actual turn signal S2, such that the turn signal indicator lamps 30, 31 can be manually turned on/off by the operator, and can be automatically turned on/off by the turn signal control module 40.

The turn signal control module 40 may include a processing chip such as a central processing unit (CPU), a microcontroller, or an embedded controller disposed therein. However, the turn signal control module 40 can include other circuitry, such as, but not being limited to, memory elements.

In this embodiment, the turn signal control module 40 is configured for operatively determining whether the desired turn direction indicated by the desired turn signal S1 is corresponding to the actual turn direction indicated by the actual turn signal S2 while the operator turns the vehicle. When the turn signal control module 40 determines that the desired turn direction indicated by the desired turn signal S1 is opposite to the actual turn direction indicated by the actual turn signal S2, the turn signal control module 40 automatically turns off one of the turn signal indicator lamps 30, 31 activated by the desired turn signal 51 and turns on another one of the turn signal indicator lamps 30, 31 in response to the actual turn direction indicated by the actual turn signal.

For example, the operator wishes to turn the vehicle in the left direction, and activates the left turn signal indicator lamp 31, but at the same time turns the vehicle in the right direction, so that the left turn signal indicator lamp 31 will be automatically turned off, and the right turn signal indicator lamp 30 will be automatically turned on in response to the actual right turn direction indicated by the actual turn signal S2. Moreover, the flashing light of the right turn signal indicator lamp 30 can be more bright than usual to indicate the actual turn direction to an observer such as a driver in the right rear for warning.

In one embodiment, the turn signal control module 40 has an auto mode. When in the auto mode, the right or left turn signal indicator lamp 30, 31 will be automatically turned on to indicate the actual right or left turn direction of the vehicle no matter whether the desired turn signal S1 is activated or not.

When the safety indicating apparatus 100 is utilized with a vehicle such as an electric motorcycle, the vehicle may include a shaft transmission system 502, a tracking motor system 503, a voltage transferring system 504, and a voltage source 505. The shaft transmission system 502 is connected between the wheel system 501 and the tracking motor system 503. The tracking motor system 503, the voltage transferring system 504, and the voltage source 505 are electrically connected to the turn signal control module 40 respectively. The functionality of the shaft transmission system 502, the tracking motor system 503, the voltage transferring system 504, and the voltage source 505 would be apparent to those skilled in the art and are not further described in detail herein.

It should be noted that FIG. 1 is merely used for illustrating a functional block diagram for a safety indicating apparatus utilized with a vehicle, and the present disclosure is not limited thereto. The type, actual structure, implementation method, and/or connection method associated with the safety indicating apparatus, the vehicle, and the instant embodiment is not limited thereto.

Second Exemplary Embodiment of a Safety Indicating Apparatus

Figure 2:
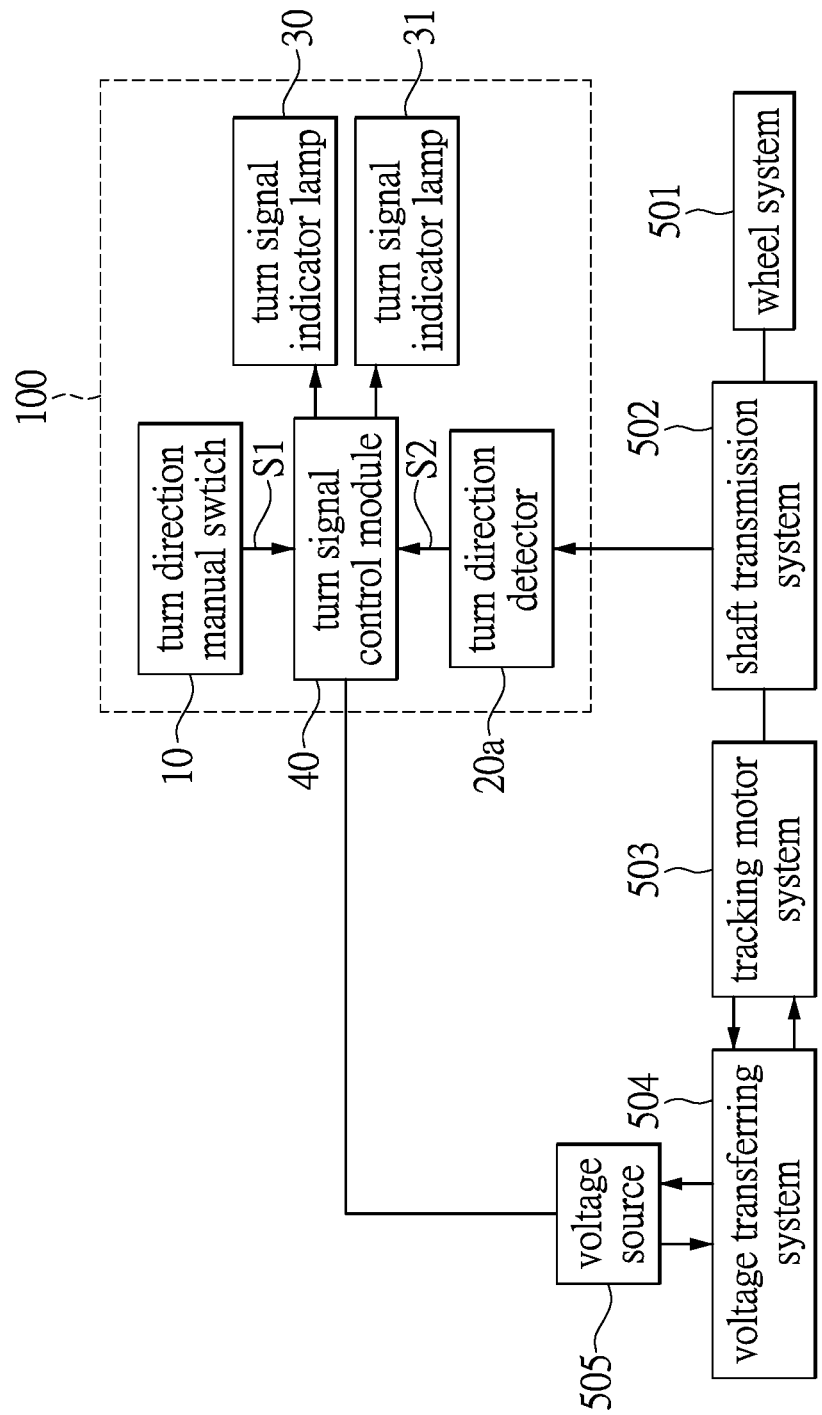
FIG. 2 is a functional block diagram of a safety indicating apparatus for a vehicle provided in accordance to a second exemplary embodiment of the present disclosure.

Please refer to FIG. 2, which shows a functional block diagram of a safety indicating apparatus provided in accordance to a second exemplary embodiment of the present disclosure. The present exemplary embodiment is similar to that of the first exemplary embodiment described above, so that the same reference numbers used in the previous drawing will be used to refer to the same or like parts. The main difference between the present exemplary embodiment and the first exemplary embodiment is that the turn direction detector 20*a* is disposed on the shaft transmission system 502 of the vehicle, and the turn direction detector 20*a* may be a shaft transmission rotation sensor for detecting a rotational direction of the shaft of the shaft transmission system 502 in order to provide an actual turn signal S2 to the turn signal control module 40.

Third Exemplary Embodiment of a Safety Indicating Apparatus

Figure 3:
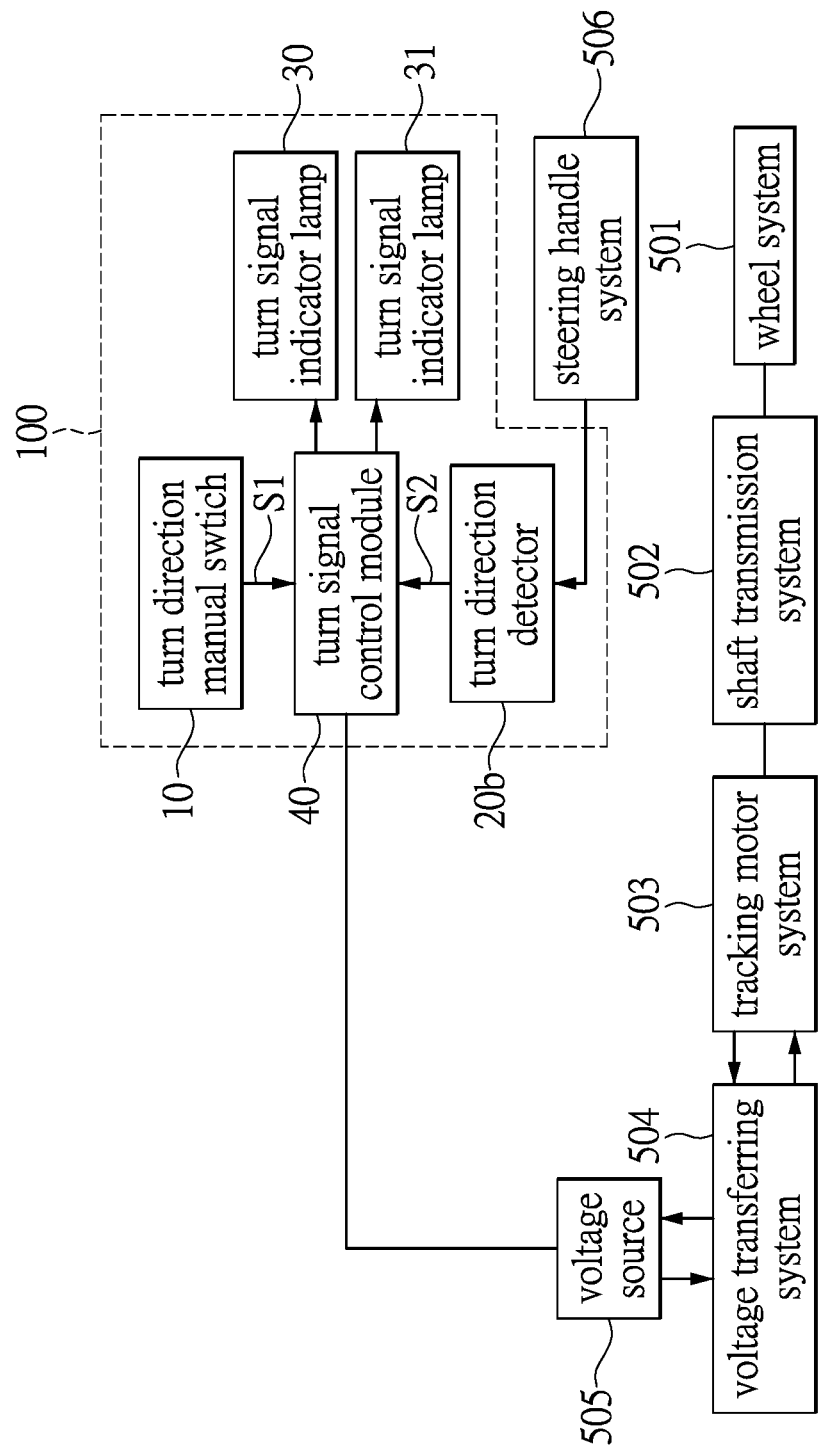
FIG. 3 is a functional block diagram of a safety indicating apparatus for a vehicle provided in accordance to a third exemplary embodiment of the present disclosure.

Please refer to FIG. 3, which shows a functional block diagram of a safety indicating apparatus provided in accordance to a third exemplary embodiment of the present disclosure. The present exemplary embodiment is similar to that of the first exemplary embodiment described above, so that the same reference numbers used in the previous drawing will be used to refer to the same or like parts. The main difference between the present exemplary embodiment and the first exemplary embodiment is that the turn direction detector 20b is disposed on the steering handle system 506 of the vehicle, and the turn direction detector 20b may be a steering handle rotation sensor for detecting a rotational direction of the steering handle of the steering handle system 506 in order to provide an actual turn signal S2 to the turn signal control module 40.

Fourth Exemplary Embodiment of a Safety Indicating Apparatus

Figure 4:
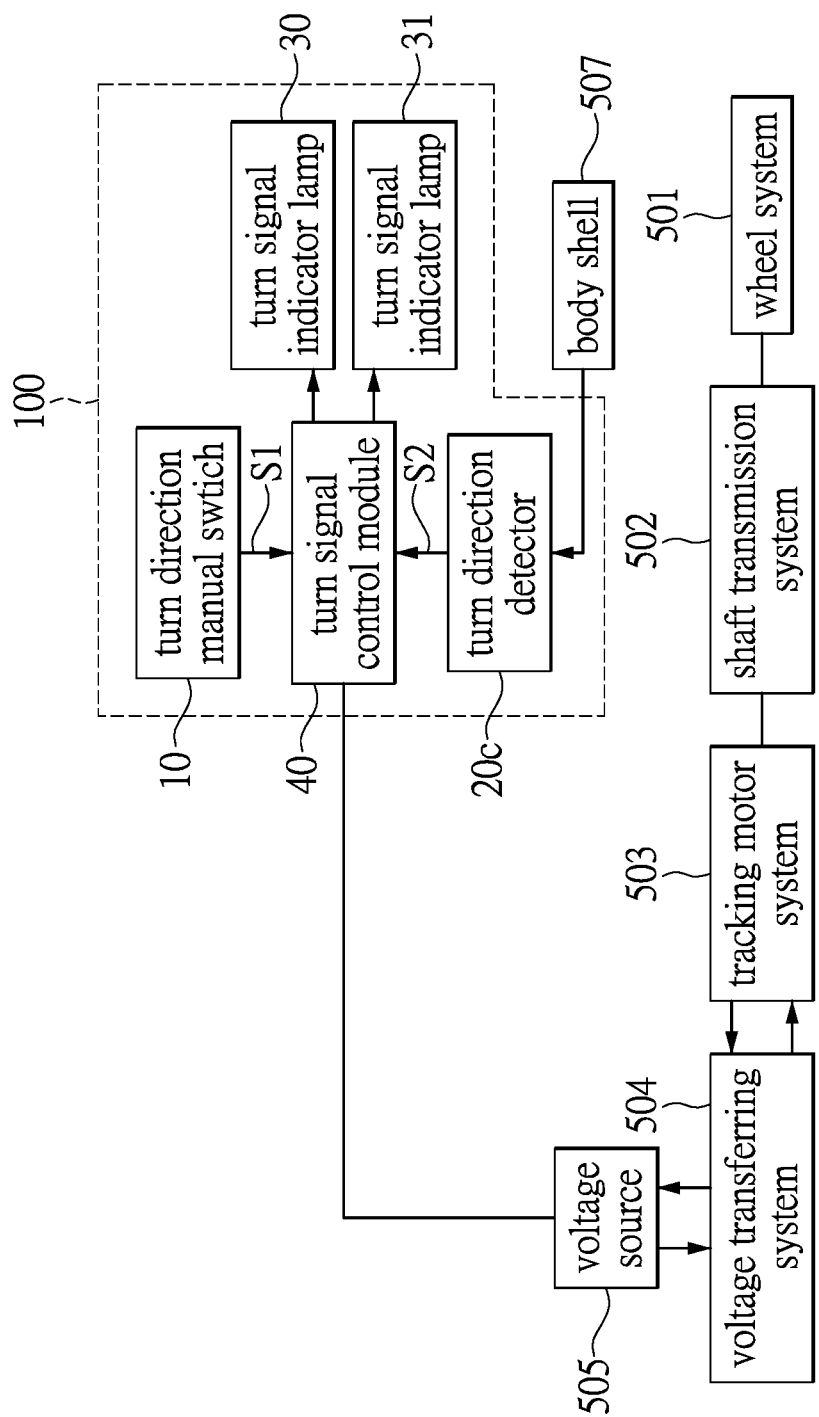
FIG. 4 is a functional block diagram of a safety indicating apparatus for a vehicle provided in accordance to a fourth exemplary embodiment of the present disclosure.

Please refer to FIG. 4, which shows a functional block diagram of a safety indicating apparatus provided in accordance to a fourth exemplary embodiment of the present disclosure. The present exemplary embodiment is similar to that of the first exemplary embodiment described above, so that the same reference numbers used in the previous drawing will be used to refer to the same or like parts. The main difference between the present exemplary embodiment and the first exemplary embodiment is that the turn direction detector 20b is disposed on the body shell 507 of the vehicle, and the turn direction detector 20b may be a tilt sensor for sensing a tilt direction of the body shell 507 of the vehicle in order to provide an actual turn signal S2 to the turn signal control module 40.

In summary, the exemplary embodiments of the present disclosure provide a safety indicating apparatus for a vehicle, which can, through disposing the turn direction detector, actively determine whether the desired turn direction indicated by the desired turn signal is corresponding to the actual turn direction indicated by the actual turn signal while the operator turns the vehicle, thereby reducing the possibility of a traffic accident.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A safety indicating apparatus for a vehicle, comprising:
a turn direction manual switch, configured for providing a desired turn signal activated by an operator to indicate a desired turn direction of the vehicle;
a turn direction detector, configured for providing an actual turn signal to indicate an actual turn direction of the vehicle;
two turn signal indicator lamps, operated for selectively turning on or turning off on the basis of the desired turn signal or the actual turn signal; and
a turn signal control module, electronically connected to the turn direction manual switch, the turn direction detector, and the turn signal indicator lamps for operatively determining whether the desired turn direction indicated by the desired turn signal is corresponding to the actual turn direction indicated by the actual turn signal while the operator turns the vehicle;
wherein when the turn signal control module determines that the desired turn direction indicated by the desired turn signal is opposite to the actual turn direction indicated by the actual turn signal, the turn signal control module automatically turns off one of the turn signal indicator lamps activated by the desired turn signal and turns on another one of the turn signal indicator lamps in response to the actual turn direction indicated by the actual turn signal.

2. The safety indicating apparatus for a vehicle according to claim 1, wherein the turn direction detector is disposed on a wheel system of the vehicle.

3. The safety indicating apparatus for a vehicle according to claim 2, wherein the turn direction detector is a compass or a gyro sensor.

4. The safety indicating apparatus for a vehicle according to claim 1, wherein the turn direction detector is disposed on a shaft transmission system of the vehicle.

5. The safety indicating apparatus for a vehicle according to claim 4, wherein the turn direction detector is a shaft transmission rotation sensor for detecting a rotational direction of a shaft of the shaft transmission system.

6. The safety indicating apparatus for a vehicle according to claim 1, wherein the turn direction detector is disposed on a steering handle system of the vehicle.

7. The safety indicating apparatus for a vehicle according to claim 6, wherein the turn direction detector is a steering handle rotation sensor for detecting a rotational direction of a steering handle of the steering handle system.

8. The safety indicating apparatus for a vehicle according to claim 1, wherein the turn direction detector is disposed on a body shell of the vehicle.

9. The safety indicating apparatus for a vehicle according to claim 8, the turn direction detector is a tilt sensor for sensing a tilt direction of the body shell of the vehicle.

* * * * *